April 30, 1929.　　J. A. CARR　　1,710,919
METHOD AND APPARATUS FOR MAKING HOLLOW BODIES
Filed March 6, 1928　　2 Sheets-Sheet 1
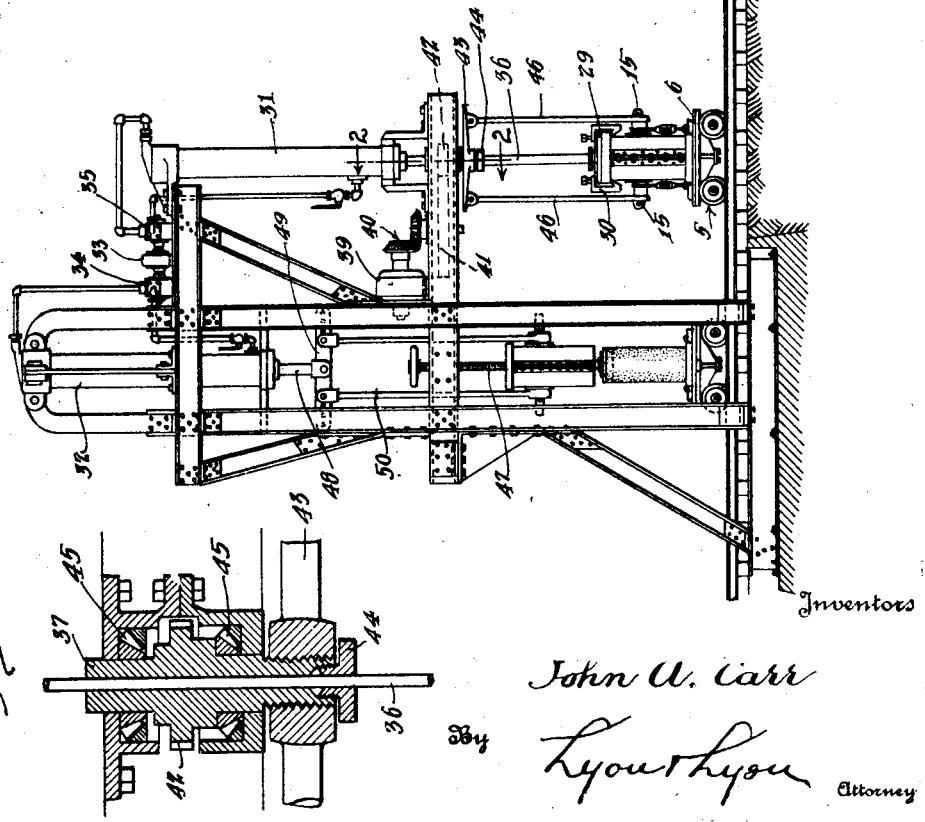
Inventors
John A. Carr
By Lyon+Lyon
Attorney

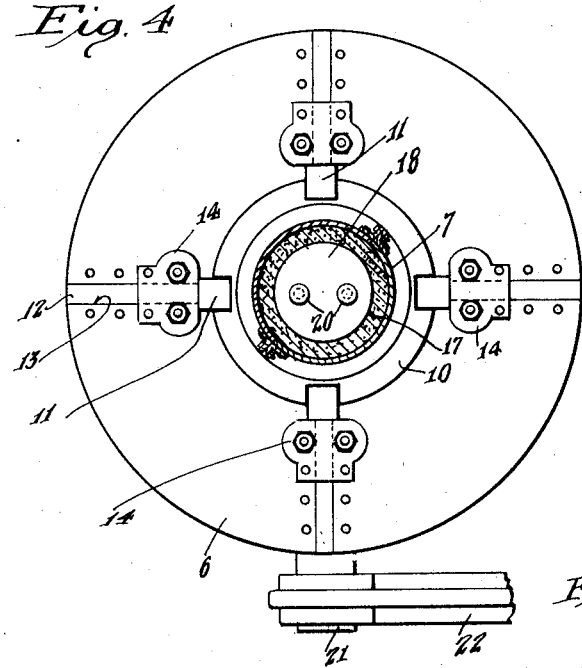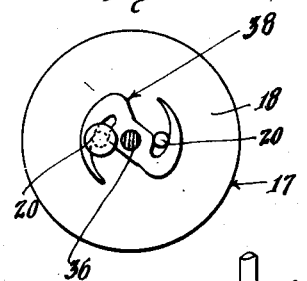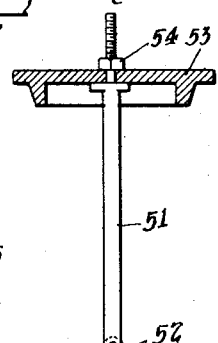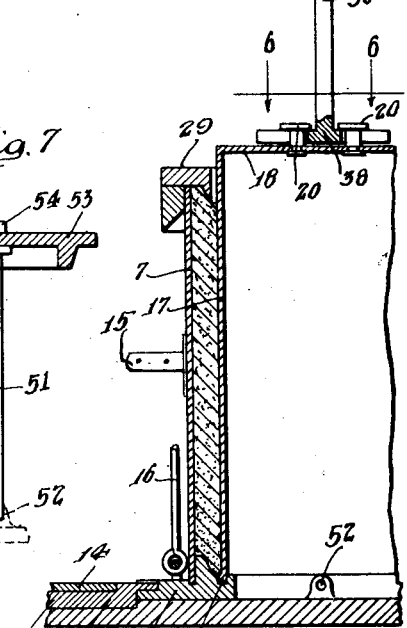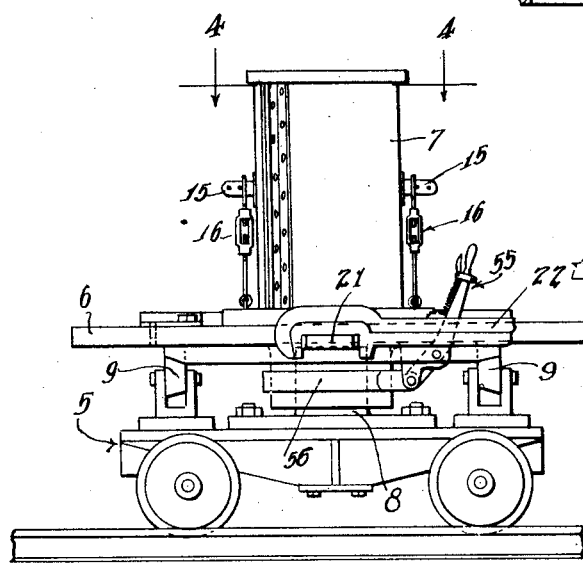

Patented Apr. 30, 1929.

1,710,919

UNITED STATES PATENT OFFICE.

JOHN A. CARR, OF LOS ANGELES, CALIFORNIA.

METHOD AND APPARATUS FOR MAKING HOLLOW BODIES.

Application filed March 6, 1928. Serial No. 259,458.

This invention relates to a new and improved method of making cementitious bodies, particularly from plastic compositions and particularly from plastic, hydraulic cement compositions. The method is applicable to the manufacture of numerous types of hollow bodies from such plastic compositions, such as columns, piles, pipe and the like but for purposes of illustration, reference shall be made hereinafter to the specific application of the method to the manufacture of hollow concrete pipe.

This invention also relates to an apparatus adapted to carry out the method. It will be understood that various changes and modifications may be made both in the apparatus and in some of the detailed steps of the method without departing from this invention, one particular form of apparatus being illustrated and described in detail primarily to disclose one form of apparatus by means of which the various steps of the method may be put into operation.

Although one step of the preferred method embracing my invention employs centrifugal force in the manufacture of hollow bodies from plastic hydraulic cement compositions, the entire process or method differs radically both in the manner of operation, in the character of the substances treated, and in the results obtained. It is admitted that heretofore hollow bodies from hydraulic cement compositions have been made by filling a mold with a plastic material and then spinning or centrifuging the mold so as to compact the cement composition on the interior surfaces of the mold. Centrifugal methods of this character cause heavy particles such as rock and sand or other aggregate to segregate from the main body of plastic material and to come to the outer surface of the body being formed. The lighter materials and laitance form a slurry principally of hydraulic cement and water which is discharged from the interior of the formed hollow body when the centrifugal motion is stopped. In this manner, hollow bodies of heterogeneous construction are formed which are relatively weak, as a large proportion of the hydraulic cement is lost in the slurry and laitance. Naturally, when concrete pipes are being made, the product is of non-uniform strength, has a relatively weak and open structure and is incapable of retarding the permeation of water therethrough to any appreciable extent.

It is well known that the ratio of water to cement in a cement composition influences the strength very materially, an increase in the amount of water rapidly reducing the strength of the final product. It has been necessary, however, to use large quantities of water heretofore in order to form a plastic composition capable of completely covering reinforcing wires and screens around which the concrete pipe, for example, is being made. Attempts have been made to subject the molds in which the bodies are being formed, to a vertical reciprocated motion or vibration, but this has not been found successful as it again causes segregation between the cement slurry and the aggregates used. Furthermore, the apparatus heretofore invented to carry out molding operations of the character described are rather complex and expensive and are incapable of forming large numbers of hollow bodies in rapid succession.

My invention obviates all of the difficulties heretofore encountered in the manufacture of hollow bodies from hydraulic cement compositions and discloses an apparatus capable of producing large quantities of such formed bodies in rapid succession, enabling a large number of men to be employed on one unit.

An object of this invention is to provide a method of making a hollow body from plastic compositions whereby a uniform homogeneous body of relatively high strength may be easily formed.

Another object is to provide a method of making hollow bodies from plastic hydraulic cement compositions whereby the plastic composition is placed within a mold uniformly and homogeneously.

Another object of my invention is to disclose a method of making hollow bodies from plastic hydraulic cement compositions in which a plastic composition is caused to form a uniform body by being subjected to a repeated partial rotation in opposed directions.

Another object is to provide a method whereby dense relatively impervious bodies may be made from plastic hydraulic cement compositions.

Another object is to disclose a method of forming hollow bodies of hydraulic cement composition having smooth exterior and interior surfaces.

Another object is to provide an apparatus for forming hollow bodies from plastic compositions.

Another object is to provide an apparatus capable of forming hollow bodies from plastic cement compositions and finishing or smoothing the exterior and interior surfaces thereof.

A still further object is to provide an apparatus for subjecting molds to a repeated partial rotation in opposed directions. A still further object is to provide an apparatus for assembling, manipulating and disassembling molds and cores.

In describing this invention, reference shall be had to the appended drawings, in which Figure 1 is a general side elevation of one form of apparatus adapted to carry out the process.

Figure 2 is a vertical section taken along line 2—2 in Figure 1.

Figure 3 is a side elevation of one form of truck or vehicle adapted to carry the mold.

Figure 4 is a plan view of the vehicle partly in section taken along line 4—4 in Figure 3.

Figure 5 is a vertical section through one portion of the mold, core and table shown in Figures 3 and 4.

Figure 6 is a plan view showing a means for picking up and removing the core, taken along line 6—6, Figure 5.

Figure 7 illustrates one form of the device adapted to retain the molded body upon the vehicle while the outer mold is removed.

For illustrative purposes, the method of operation will be described in detail as applied to the manufacture of concrete pipe. Briefly, the method comprises filling a mold comprising an outer jacket and an inner core mounted upon a rotatable table carried upon a truck or other vehicle, with plastic hydraulic cement composition and subjecting the mold and composition to a repeated, partial rotation in opposed directions so as to cause the concrete to place uniformly within the mold. The mold and core are then subjected to a repeated and complete rotation upon a vertical axis so as to compact the plastic composition within the mold. During such complete rotation the inner core is withdrawn and the inner surface of the hollow molded body preferably subjected to a troweling or finishing operation so as to produce a smooth impervious interior surface. This operation is followed by the final step of withdrawing or removing the outer jacket.

The above described steps may be carried out in the apparatus shown on the appended drawings as follows:

Concrete or other plastic material from which the hollow bodies are to be formed is supplied to a hopper 1 suitably mounted in a frame work 2. The hopper may have a conical bottom and a suitable outlet valve such as the cone valve 3 centrally disposed in the bottom of the hopper 1 and operated by means of a hydraulic ram 4 or other suitable mechanical device.

Beneath the hopper 1 there is positioned a vehicle 5 upon which is mounted a rotatable table 6 which in turn supports an outer jacket or mold 7. One form of construction of the vehicle table and jacket is shown in Figures 3, 4 and 5. The table 6 may be supported centrally upon a boss 8 having suitable bearing surfaces, and upon peripheral rollers 9 suitably supported above the base of the vehicle 5. The jacket 7 in which the molded bodies are to be formed may be supported upon a jacket ring 10 held in place upon the table 6 by means of keys 11, the lower portion 12 of said keys 11 being slidably mounted in radial grooves 13 formed in the upper surface of the table 6. Movable plates 14 may be provided for holding the keys 11 and the jacket ring 10 in place upon the table.

Any suitable jacket structure may be used, although a split jacket as illustrated in the drawings is efficient. Arms 15 may be mounted upon the outer surface of the jacket 7 and connected to the jacket ring 10 by means of turn buckles and rods 16 so as to firmly hold the jacket 7 in position upon the table. Concentrically placed within the jacket 7 is a core 17 which preferably fits into a suitable annular groove in the jacket ring 10. The core 17 may have a closed top 18 but having an open bottom and a slight enlargement or projection 19 upon its extreme bottom edge. In the manufacture of concrete pipe the jacket ring 10 is preferably formed so as to produce a suitable bell end in the concrete pipe. Lugs 20 may be mounted diametrically upon the closed upper end of the core 17.

A suitable projection 21 extends from the table 6 and is loosely connected by means of an arm 22 with a source of reciprocating motion. Any suitable means of generating reciprocating motion may be used, although such motion may be readily obtained by means of a motor 23, gearing 24 and an eccentric and link 25 and 26.

After the vehicle 5 is positioned beneath the hopper 1 and the jacket and core mounted thereon as described, a removable hopper 27 may be attached to the upper end of the jacket and the table 6 connected to the reciprocating motion generating means by means of the arm 22 and extension 21. Plastic, hydraulic cement composition is then discharged from the hopper 1 into the jacket 7 and during the filling of said jacket with the composition, the table 6, jacket 7 and core 17 are repeatedly and partially rotated in opposed directions. This operation causes the plastic composition to be placed uniformly within the jacket 7 and if reinforcing material, such as coils of wire or mesh are used, the resulting motion enables the composition to surround and permeate all of the reinforcing. It will be understood that suitable blocking means may be used to maintain the vehicle 5 in a substantially stationary position upon the tracks 28 upon which said vehicle may move.

After the jacket has been completely filled with the plastic composition, the repeated, partial rotation is discontinued and the vehicle 5, together with its jacket then moved down the tracks 28 to another portion of the apparatus. During its motion, the demountable hopper 27 may be removed and a suitable ring 29 placed upon the upper surface of the composition so as to cause it to assume the proper shape. The ring 29 may be retained upon the jacket 27 by means of clamps 30.

Again referring to Figure 1, the major portion of the apparatus comprises a suitable frame supporting at one end a hydraulic or fluid pressure cylinder 31 and a secondary fluid pressure cylinder 32. A motor 33 operably connected with pumps 34 and 35 may be used to supply fluid under pressure to the cylinders 31 and 32 through suitable pipe means bearing suitable valves for controlling the operation of the pistons within said cylinders. The piston and cylinder 31 is operably connected to a rod or shaft 36 which passes through or is journaled within a sleeve 37 (see Fig. 2), but it is not keyed thereto. A suitable spider 38 is carried upon the lower extremities of the shaft 36 (Fig. 6) and is adapted to engage with lugs 20 in the upper closed end of the core 17 so as to remove and withdraw the core 17 in a vertical direction. The apparatus also carries a motor 39 or other suitable power generating means suitably geared as by bevel gears 40 and gears 41 and 42 with the sleeve 37, the gear 42 being mounted upon the sleeve. A cross arm 43 is attached to the lower portion of the sleeve 37 and retained thereon by means of a lug nut 44. It will be understood that the sleeve 37 is mounted upon a supporting frame in suitable bearings 45.

When the vehicle 5 carrying the filled jacket 7 and core comes into position beneath the cylinder 31, the jacket 7 is connected to the cross arm 43 by means of arms 46 and lug 15. The entire jacket 7 as well as the core 17 and table 6, are then rotated continuously and completely (continuous rotation differentiates here from the preceding partial rotation in opposed directions) by means of power imparted to the cross arm 43 by the motor 39 and gears 40, 41 and 42. During this operation, the plastic composition between the core and the jacket is compacted by centrifugal force and a certain amount of shrinkage takes place, the bond between the plastic composition and the core 17 being broken after the jacket 7 has been rotated for a sufficient length of time to compact the concrete or other plastic cement composition and remove excess water from the body thereof by centrifugal motion, the piston within cylinder 31 and the shaft 36 are depressed or lowered by the required manipulation of valves until the spider 38 positioned upon the lower end of the shaft 36 engages with the lugs 20 mounted upon the upper end of the core 17. After contact is made, the shaft 36 is slowly pulled up and the enlargement 19 upon the lower end of the core 17 gently trowels the interior surface of the molded body being rotated by the cross arm 43 and arms 46. The enlargement 19 should be only sufficiently large to exert a gentle troweling action and the size or diametrical enlargement depends entirely upon the composition of the plastic body and the amount of shrinkage which takes place during the repeated rotation of the body immediately preceding the withdrawal of the core.

After the core is withdrawn, the spinning operation may be stopped and the jacket 7 disengaged from the cross arm 43 and arms 46. The clamps 30 are then removed and the ring 29 removed and the vehicle positioned beneath the cylinder 32. A centrally mounted screw 47, carrying at its lower extremity a disk of size and shape sufficient to cover the upper edge of the molded body within the jacket without covering the edge of the jacket itself, is lowered so as to exert a gentle pressure upon the molded pipe or other hollow body. The turn buckles 16 are then loosened and disengaged from the lugs 15 mounted upon the jacket 7 and shaft 48 connected with a piston within the cylinder 32 is lowered. The lower portion of the shaft 48 carries a cross arm 49 from which depend arms 50. These arms are attached to the lugs 15 and the shaft 48 then slowly raised by proper manipulation of valves so as to activate the piston within the cylinder 32. This raises and strips the jacket 7 from the molded body, the disk on the lower end of the screw 47 maintaining the molded body in position upon the vehicle.

It will be noted that in the above described operation the interior surface of the hollow molded body has been gently troweled and finished so as to form a smooth impervious coating, but the exterior surface has not been so treated. In order to form a smooth exterior finish, it may be desirable to rotate the exterior jacket 7 and then slowly withdraw the jacket while the molded body is caused to rotate at a slightly lower speed. This may be accomplished in the following manner:

The screw 47 and its supports are removed and instead the plastic body is retained upon the table 6 by means of a shaft 51 attached to a lug 52 formed centrally in the table 6. A disk 53 adjustably positioned upon the shaft 51 is adjusted by means of nuts 54 so as to contact with the upper edge of the molded body. The shaft 48 communicating with the piston within cylinder 32 should then be provided with a flange at its lower extremity cooperating with a rotatable coupling driven by a suitable means, for example, a motor and gearing in much the same manner that the sleeve 37 is driven by motor 39. That portion of the shaft connected with the bottom of the rotatable coupling is then provided with the cross arm 49 and arms 50 by means of which the jacket 7 may be rotated on a vertical axis. This rotation will also be imparted to the table 6. After a certain speed is reached, the rotation of the table 6 may be reduced by the application of a hand brake 55 suitably mounted beneath the table and having a brake band 56 of suitable material passing over that portion of the table which surrounds the boss 8. The piston within the cylinder 32 may then be activated so as to raise the shaft 48 without interfering with the rotation of the cross arm 49 and jacket 7 and in this manner a smooth surface may be produced upon the exterior of the molded body retained upon the table 6 by means of the disk 53 resting upon the upper edges of the molded body and attached to the table 6 by shaft 51.

The above construction permits rotation of the jacket 7 without imparting the rotation to shaft 48 or the piston within the cylinder 32 by reason of the intervention of the rotatable or loose coupling mentioned hereinbefore. Instead of applying a rotary motion to the jacket 7 by means of arms 50 and cross arm 49, the jacket 7, together with table 6 and the formed body within the jacket may be rotated through a large gear mounted upon the table 6 or through gears cut in the outer periphery of the table adapted to engage with a driven gear positioned near the track 28 and adapted to engage with the gear carried by the table 6. In this way, the table together with the molded body within the jacket 7 may be slowly rotated while the jacket is pulled off the formed body. Obviously, if the operation of completely spinning the mold is not employed and only the steps of filling a mold and then subjecting the mold and plastic cementitious material therein to a repeated partial and reciprocated rotation be fulfilled, then the resulting mold and body will not be hollow but instead composed of a dense homogeneous cementitious mass. This simplified operation is particularly desirable in the manufacture of columns and piles. Other columns provided with a hollow center may be produced by filling a jacket or mold with plastic cementitious material, subjecting the jacket to a repeated partial rotation in opposed directions and then completely spinning the jacket as described hereinabove. A central core need not be employed during these operations, it having been found that a small core or opening may be formed by a prolonged, complete, and repeated rotation of the jacket, the excess water collecting at the center of the mass. Piles made in accordance with this method are particularly effective for marine work as the concrete is of great density and is not affected by sea water. The surface of the core thus formed is very dense and not effected by sea water. Furthermore, the core or opening extending through the core of the pile may be employed for jetting purposes during the driving of the pile.

Various modifications and changes may be made both in the process and in the apparatus described in detail hereinbefore and all changes and modifications coming within the scope of the following claims are embraced thereby.

I claim:

1. The method of making cementitious bodies from plastic compositions comprising, depositing plastic composition within a vertical mold and subjecting said mold and plastic to a repeated, partial and reciprocated rotation.

2. The method of making cementitious bodies from plastic hydraulic cement compositions comprising, depositing plastic compositions within a vertical mold and subjecting said mold and plastic to a repeated partial rotation in opposed directions.

3. The method of making cementitious bodies from plastic hydraulic cement compositions comprising, depositing a plastic hydraulic cement composition within a vertical mold and subjecting said mold during deposition of plastic therein to a repeated partial rotation in opposed directions on a vertical axis.

4. A process of making concrete pipe comprising depositing concrete between a vertical mold and core and subjecting the concrete and mold to a repeated partial rotation in opposed directions.

5. The process of making hollow bodies from plastic hydraulic cement compositions comprising, depositing a plastic hydraulic cement composition between a vertical mold and a core and subjecting the composition and mold to a repeated partial rotation in opposed directions on a vertical axis.

6. The method of making hollow bodies from plastic hydraulic compositions comprising, depositing a plastic hydraulic composition between a vertical mold and core, subjecting the composition and mold to a repeated partial rotation in opposed directions, and then completely rotating the mold.

7. The method of making hollow bodies from plastic hydraulic compositions comprising, depositing a plastic hydraulic composition between a vertical mold and core, subjecting the composition and mold to a repeated partial rotation in opposed directions, then completely rotating the mold and withdrawing the core.

8. The method of making hollow bodies from plastic hydraulic compositions comprising, depositing a plastic hydraulic composition between a vertical mold and core, subjecting the composition and mold to a repeated partial rotation in opposed directions on a vertical axis, then completely rotating the mold and withdrawing the core during the rotation of the mold and hydraulic composition.

9. The method of making hollow bodies from plastic hydraulic compositions comprising, depositing a hydraulic composition between a vertical mold and core, subjecting the composition and mold to a repeated partial rotation in opposed directions on a vertical axis, and then separately and completely rotating the mold and withdrawing the core.

10. The method of making concrete pipe comprising depositing concrete in a vertical mold and core, subjecting the concrete and mold to a repeated partial rotation in opposed directions on a vertical axis, then completely rotating the mold and withdrawing the core during the rotation of the mold and concrete.

11. An apparatus for making hollow bodies of plastic hydraulic compositions comprising, a vehicle, a rotatable table mounted on said vehicle, a hollow vertical mold mounted on said table, power means for generating a reciprocating motion, and means for operatively and detachably connecting the reciprocating, generating means with said table to cause repeated, partial rotation thereof in opposed directions.

12. An apparatus for making hollow bodies of plastic hydraulic compositions comprising, a vehicle, a rotatably mounted table upon said vehicle, a hollow vertical mold detachably mounted upon said table, a vertical core centrally disposed within said mold and detachably mounted upon said table, a separate power means for generating a reciprocating motion and means for operatively and detachably connecting the reciprocating means with said table to cause a repeated, partial rotation thereof, and the mold and core in opposed directions.

13. An apparatus for making hollow bodies of plastic hydraulic compositions comprising, a vehicle, a rotatable table mounted upon said vehicle, a hollow vertical mold and a centrally disposed core detachably mounted upon said table, a separate means for generating reciprocating motion, means for operatively and detachably connecting the reciprocating means with said table to cause repeated partial rotation thereof in opposed directions, separate means for completely and continuously rotating said mold, and means for withdrawing the core from within said mold.

14. An apparatus for making concrete pipe comprising, a vehicle, a rotatable table mounted upon said vehicle, a vertical mold and core concentrically and detachably mounted upon said table, means for imparting a partial rotation to said table, mold and core in opposed directions, separate means for completely rotating the mold and table and hydraulically operated means for withdrawing the core from within the mold during rotation thereof.

15. The method of making hollow bodies from plastic hydraulic compositions comprising, depositing a hydraulic composition between a vertical mold and core, subjecting the composition and mold to a repeated, partial rotation in opposed directions on a vertical axis, then continuously and completely rotating the mold, withdrawing the core during such complete rotation of the mold, restricting the vertical motion of the molded body and removing the mold.

16. The method of making hollow bodies from plastic, hydraulic compositions comprising, depositing hydraulic composition between a vertical mold and core, subjecting the composition and mold to a repeated, partial rotation in opposed directions on a vertical axis, then separately and completely rotating the mold upon a vertical axis and withdrawing the core during said rotation along said vertical axis, restraining the motion of the hollow body so formed in a vertical plane and removing the mold from said body while the body and mold rotate at slightly different speeds.

17. An apparatus for making hollow bodies of plastic, hydraulic compositions comprising, a vehicle, a rotatable table mounted upon said vehicle, means for retarding the rotation of said table, a vertical mold and core concentrically and detachably mounted upon said table, means for imparting a repeated, partial rotation of the table, mold and core in opposed directions, separate means for completely rotating the mold and table, and hydraulically operating means for withdrawing the core from within the mold during rotation thereof.

18. An apparatus for making hollow bodies from plastic, hydraulic compositions comprising, a vehicle, a rotatable table mounted on said vehicle, means for retarding the motion of said table mounted on said vehicle, a hollow mold detachably mounted on said table, a concentrically mounted inner core having an enlargement at its lower extremity mounted upon said table, a separate power means for generating a reciprocating motion and means for operably and detachably connecting the reciprocating means with said table to cause a repeated, partial rotation in opposed directions.

Signed at Los Angeles, California, this 13th day of February, 1928.

JOHN A. CARR.